(12) United States Patent
Nielson et al.

(10) Patent No.: US 11,435,513 B2
(45) Date of Patent: Sep. 6, 2022

(54) WIRE GRID POLARIZER WITH SLANTED SUPPORT-RIBS

(71) Applicant: Moxtek, Inc., Orem, UT (US)

(72) Inventors: R. Stewart Nielson, Pleasant Grove, UT (US); Bradley R. Williams, Pocatello, ID (US); Bob West, Orem, UT (US)

(73) Assignee: Moxtek, Inc., Orem, UT (US)

( * ) Notice: Subject to any disclaimer, the term of this patent is extended or adjusted under 35 U.S.C. 154(b) by 267 days.

(21) Appl. No.: 16/992,391

(22) Filed: Aug. 13, 2020

(65) Prior Publication Data

US 2021/0063622 A1 Mar. 4, 2021

Related U.S. Application Data

(60) Provisional application No. 62/949,568, filed on Dec. 18, 2019, provisional application No. 62/894,484, filed on Aug. 30, 2019, provisional application No. 62/892,135, filed on Aug. 27, 2019.

(51) Int. Cl.
*G02B 5/30* (2006.01)

(52) U.S. Cl.
CPC .......... *G02B 5/3058* (2013.01); *G02B 5/305* (2013.01)

(58) Field of Classification Search
CPC .. G02B 5/3058; G02B 5/305; G02F 1/133548
See application file for complete search history.

(56) References Cited

U.S. PATENT DOCUMENTS

| | | | |
|---|---|---|---|
| 9,995,864 B2 | 6/2018 | Diwan et al. | |
| 2011/0286094 A1* | 11/2011 | Kaida | G02B 5/3058 359/485.05 |
| 2018/0136515 A1* | 5/2018 | Nam | G02B 5/3058 |
| 2019/0317260 A1 | 10/2019 | Williams et al. | |
| 2020/0173021 A1 | 6/2020 | Linford et al. | |

\* cited by examiner

*Primary Examiner* — Angela K Davison
(74) *Attorney, Agent, or Firm* — Thorpe, North & Western, LLP

(57) ABSTRACT

A wire grid polarizer (WGP) can include an array of support-ribs on a substrate. Sides of the support-ribs can be inclined to one side. A wire can be applied on an upper-side and distal end of each support-rib, each wire being separate from wires on adjacent support-ribs. The WGP can be made with reduced or no etching.

20 Claims, 10 Drawing Sheets

WIRE GRID POLARIZER WITH SLANTED SUPPORT-RIBS

CLAIM OF PRIORITY

This application claims priority to: U.S. Provisional Patent Application No. 62/892,135, filed on Aug. 27, 2019; U.S. Provisional Patent Application No. 62/894,484, filed on Aug. 30, 2019; and to U.S. Provisional Patent Application No. 62/949,568, filed on Dec. 18, 2019; all of which are incorporated herein by reference.

FIELD OF THE INVENTION

The present application is related generally to wire grid polarizers.

BACKGROUND

A wire grid polarizer (WGP) can divide light into two different polarization states, One polarization state can primarily pass through the WGP and the other polarization state can be primarily absorbed or reflected. The effectiveness or performance of WGPs is based on high transmission of a predominantly-transmitted polarization (sometimes called Tp) and minimal transmission of an opposite polarization (sometimes called Ts). It can be beneficial to have high contrast (Tp/Ts). Contrast can be improved by increasing transmission of the predominantly-transmitted polarization (e.g. increasing Tp) and by decreasing transmission of the opposite polarization (e.g. decreasing Ts). It would be advantageous to improve performance of WGPs.

Ribs of high-performance WGPs, especially for polarization of visible or ultraviolet light, and ribs of other optical devices, can be small and delicate with nanometer-sized pitch, wire-width, and wire-height. It can be costly to manufacture such WGPs and other optical devices. It would be advantageous to discover less costly manufacturing methods for optical devices.

Patterning and etching can form wires of the WGP. Some desirable materials for wire grid polarizers can be difficult or impractical to etch. It would be beneficial to reduce or eliminate the need for etching to form the wires.

SUMMARY

It has been recognized that it would be advantageous to improve performance of wire grid polarizers (WGPs), to discover less costly methods for manufacture of WGPs, and to reduce or eliminate the need for etching such WGPs. The present invention is directed to various embodiments of WGPs, and methods of making WGPs, that satisfy these needs. Each embodiment may satisfy one, some, or all of these needs.

The WGP can include an array of support-ribs on a substrate. Sides of the support-ribs can be inclined to one side. There can be a wire on an upper-side and a distal end of each support-rib, each wire being separate from wires on adjacent support-ribs.

BRIEF DESCRIPTION OF THE DRAWINGS (DRAWINGS MIGHT NOT BE DRAWN TO SCALE)

Figure 1:
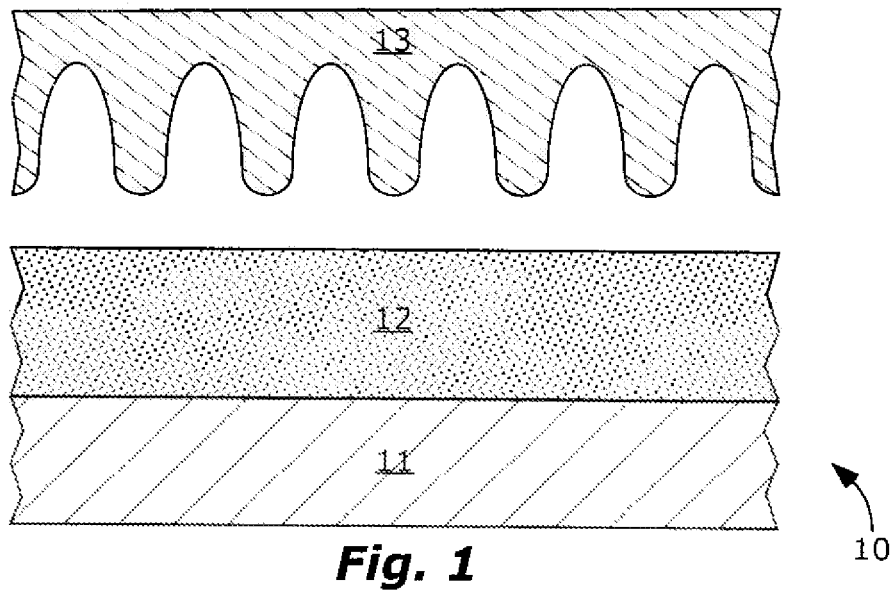

FIG. 1 is a schematic, cross-sectional side-view illustrating a step 10 in a method of making a wire grid polarizer (WGP), including applying an uncured layer 12 on a substrate 11, in accordance with an embodiment of the present invention.

Figure 2:
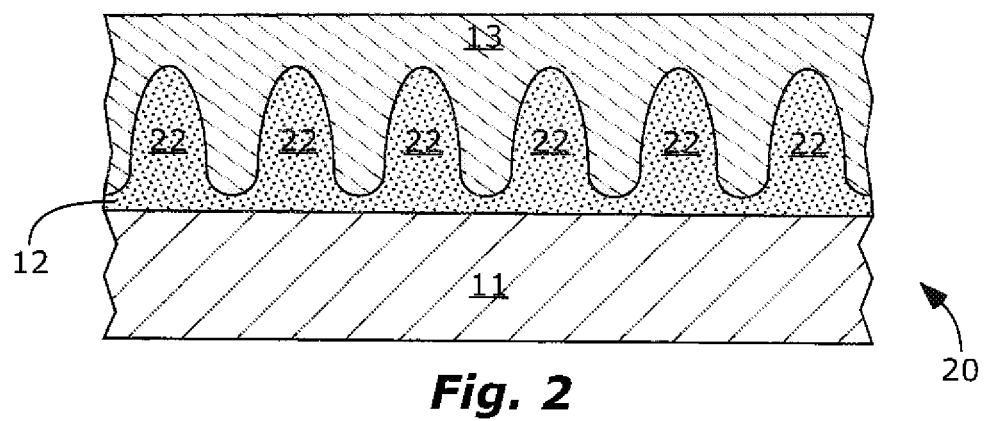

FIG. 2 is a schematic, cross-sectional side-view illustrating a step 20, which can follow step 10, in a method of making a WGP, including imprinting support-ribs 22 in the uncured layer 12, in accordance with an embodiment of the present invention.

Figure 3:
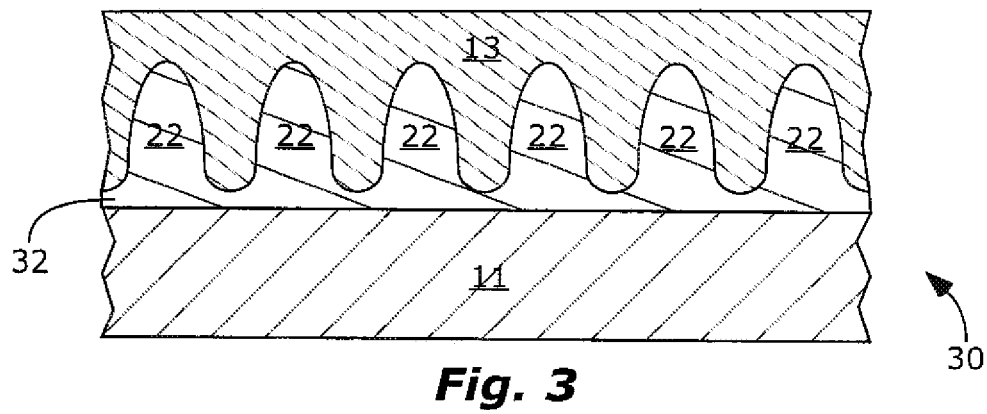

FIG. 3 is a schematic, cross-sectional side-view illustrating a step 30, which can follow step 20, in a method of making a WGP, including curing the uncured layer 12 to form a cured layer 32, in accordance with an embodiment of the present invention.

Figure 4:
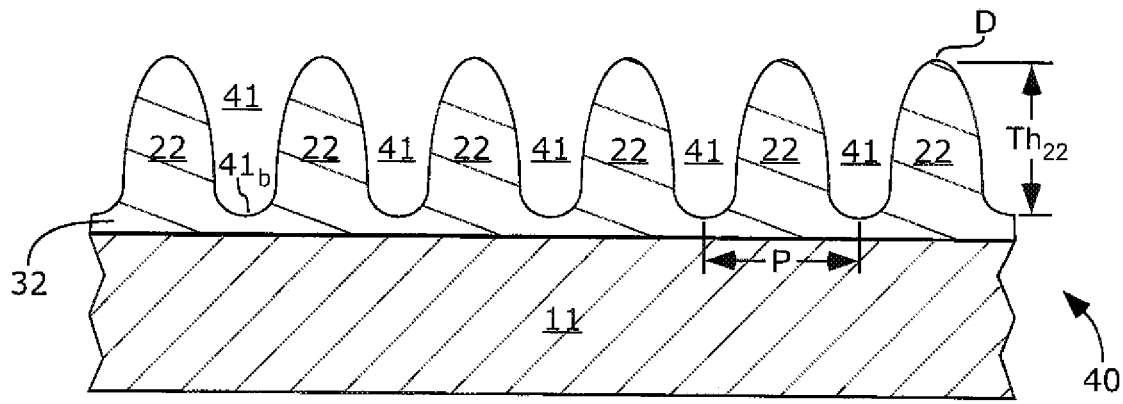

FIG. 4 is a schematic, cross-sectional side-view illustrating a step 40, which can follow step 30, in a method of making a WGP, including removing the mold or stamp 13, leaving support-ribs 22 in the cured layer 32 with channels 41 between adjacent support-ribs 22, in accordance with an embodiment of the present invention.

Figure 5:
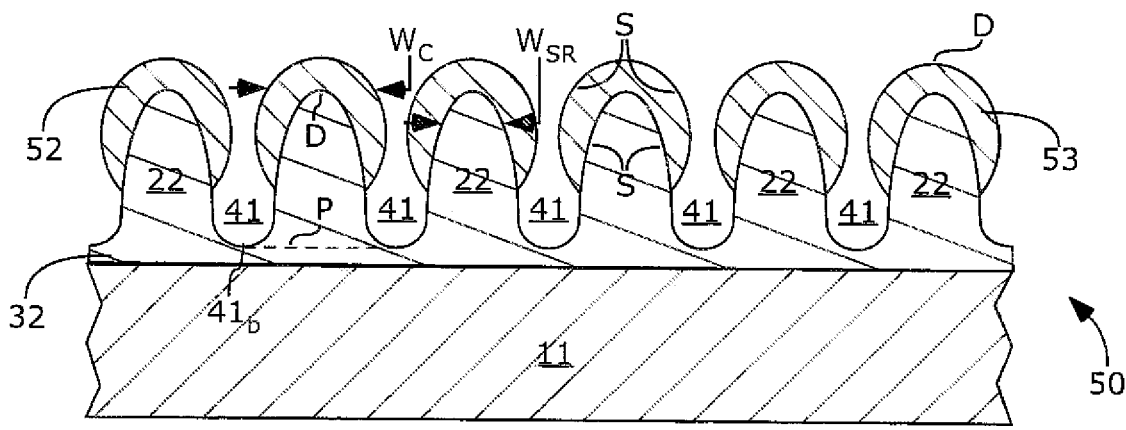

FIG. 5 is a schematic, cross-sectional side-view illustrating a step 50, which can follow step 40, in a method of making a WGP, including depositing a cap 52 on each support-rib 22, each cap 52 extending down sides S of the support-rib 22, in accordance with an embodiment of the present invention.

Figure 6A:
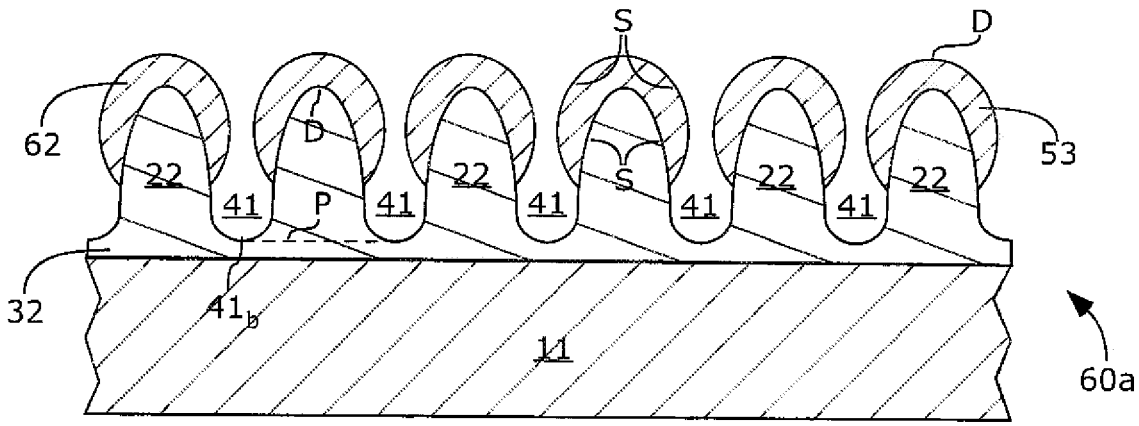

FIG. 6a is a schematic, cross-sectional side-view illustrating a step 60a, which can follow step 40, in a method of making a WGP, including depositing a wire 62 on each support-rib 22, each wire 62 extending down sides S of the support-rib 22, in accordance with an embodiment of the present invention.

Figure 6B:
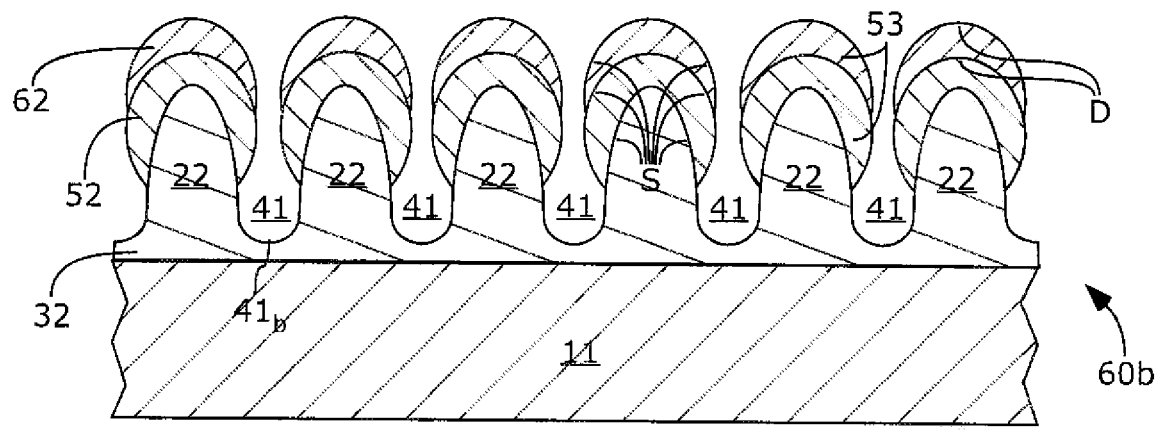

FIG. 6b is a schematic, cross-sectional side-view illustrating a step 60b, which can follow step 50, in a method of making a WGP, including depositing a wire 62 on each cap 52, each wire 62 extending down sides S of the cap 52, in accordance with an embodiment of the present invention.

Figure 7:
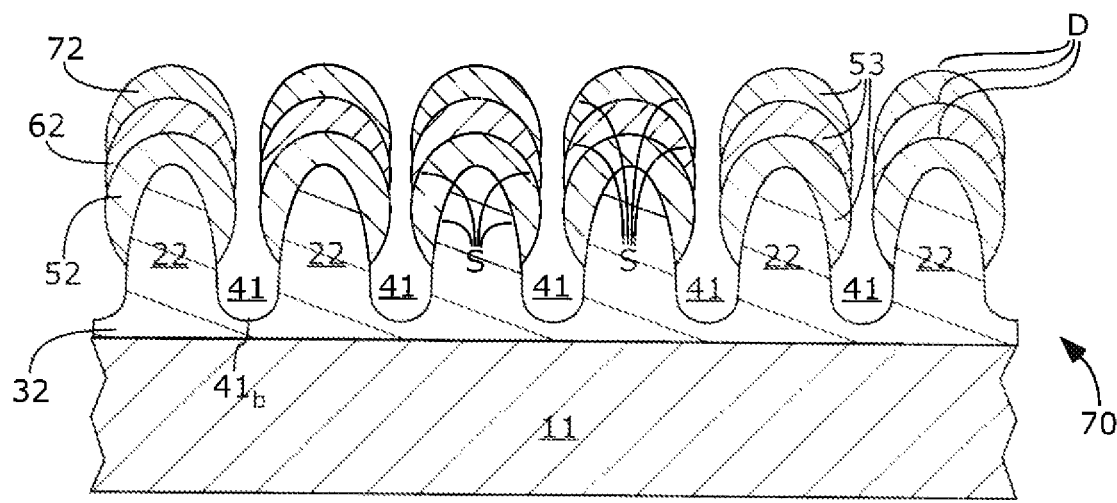

FIG. 7 is a schematic, cross-sectional side-view illustrating a step 70, which can follow step 60a or 60b, in a method of making a WGP, including depositing a lower rib 72 on each wire 62, each lower rib 72 extending down sides S of the wire 62, in accordance with an embodiment of the present invention.

Figure 8:
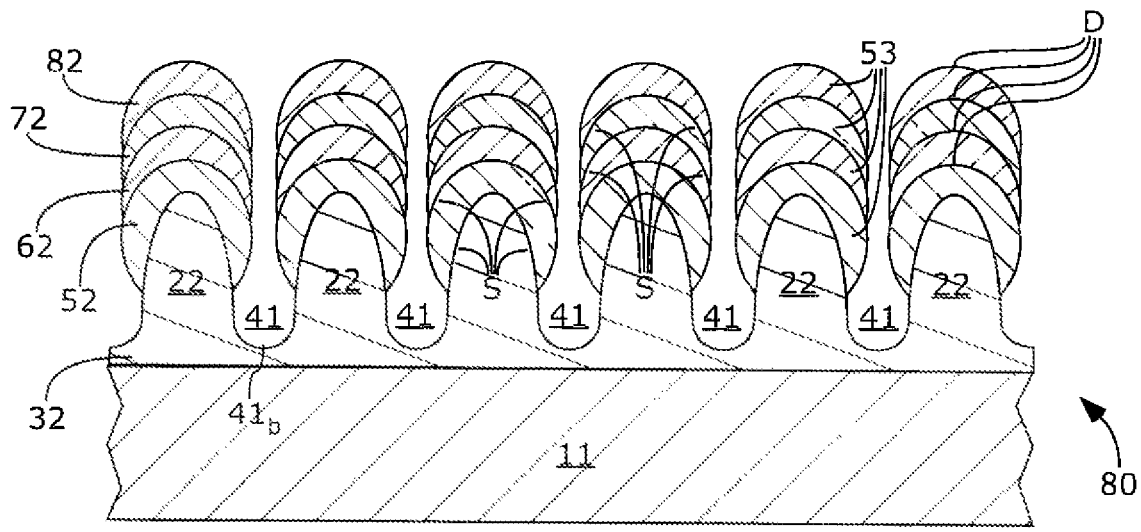

FIG. 8 is a schematic, cross-sectional side-view illustrating a step 80, which can follow step 70, in a method of making a WGP, including depositing a top rib 82 on each lower rib 72, each top rib 82 extending down sides S of the lower rib 72, in accordance with an embodiment of the present invention.

Figure 9:
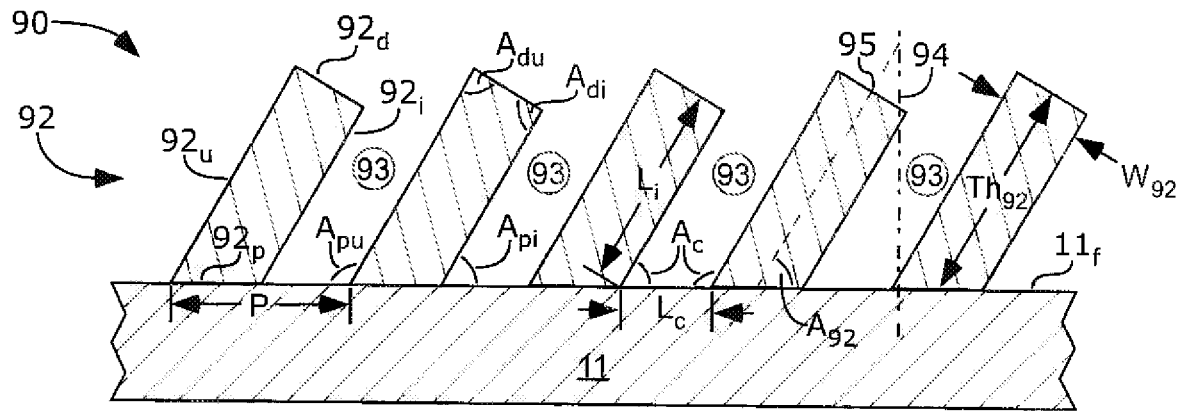

FIG. 9 is a schematic, cross-sectional side-view of an optical device 90 including an array of parallel, elongated support-ribs 92 on a face $11_f$ of a substrate 11, and sides $92_i$ and $92_u$ of the support-ribs 92 inclined to one side, in accordance with an embodiment of the present invention.

Figure 10:
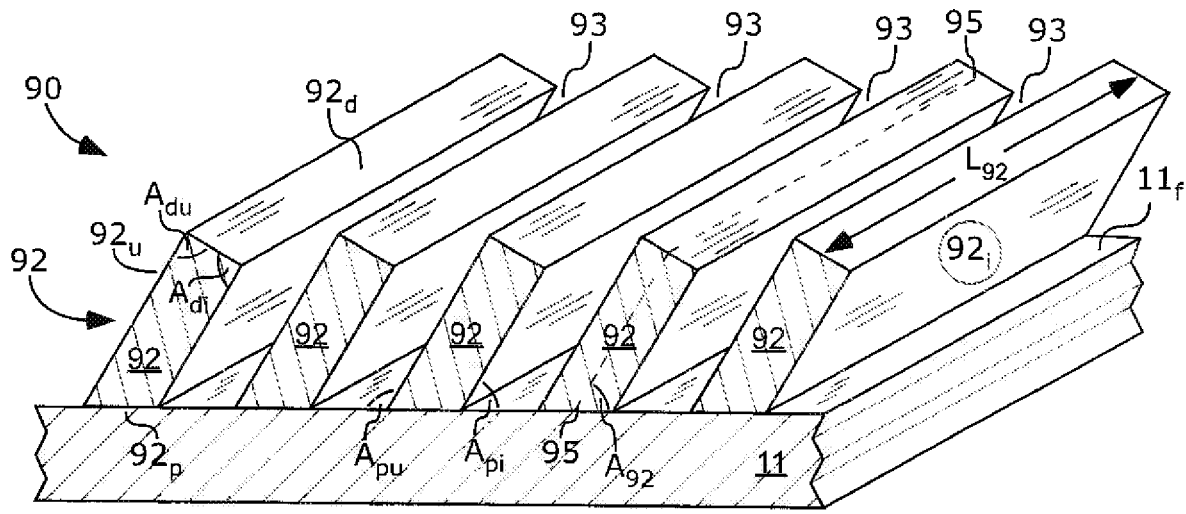

FIG. 10 is a schematic perspective-view of the optical device 90 of FIG. 9, in accordance with an embodiment of the present invention.

Figure 11:
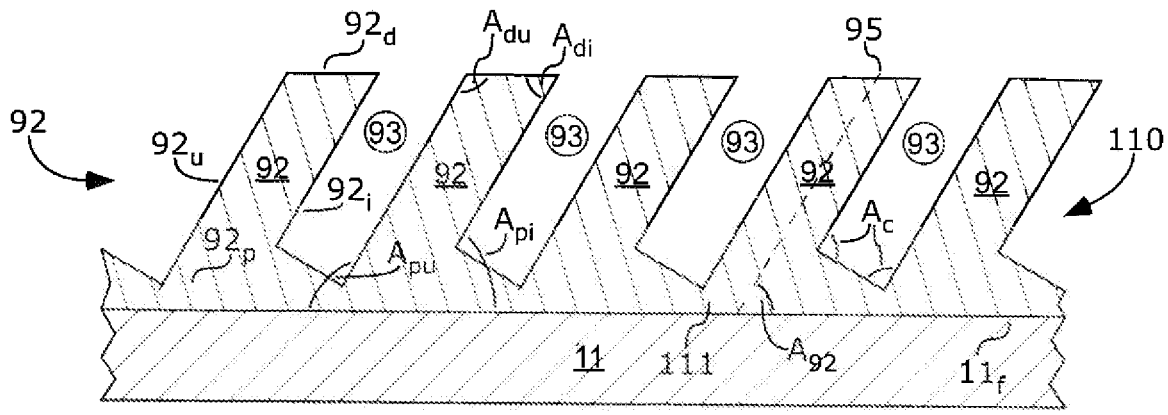

FIG. 11 is a schematic, cross-sectional side-view of an optical device 110, similar to optical device 90, except that for optical device 110, external angles $A_{pi}$ and $A_{pu}$ at the proximal end $92_p$ are similar in value to internal angles $A_{di}$ and $A_{du}$, respectively, at the distal end $92_d$, in accordance with an embodiment of the present invention.

Figure 12:
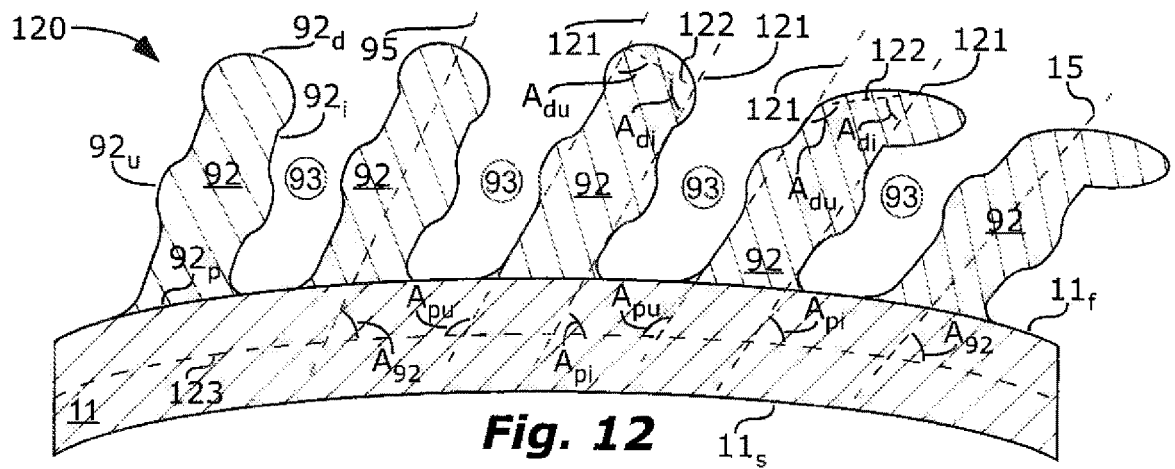

FIG. 12 is a schematic, cross-sectional side-view of an optical device 120, similar to other optical devices described herein, providing guidance how angles $A_{pi}$, $A_{pu}$, $A_{di}$, and $A_{du}$ are defined or interpreted, particularly if the sides $92_i$ and $92_u$ are curved, if the face $11_f$ of the substrate 11 is rough or curved, if the distal end $92_d$ is curved, or combinations thereof, in accordance with an embodiment of the present invention.

Figure 13:
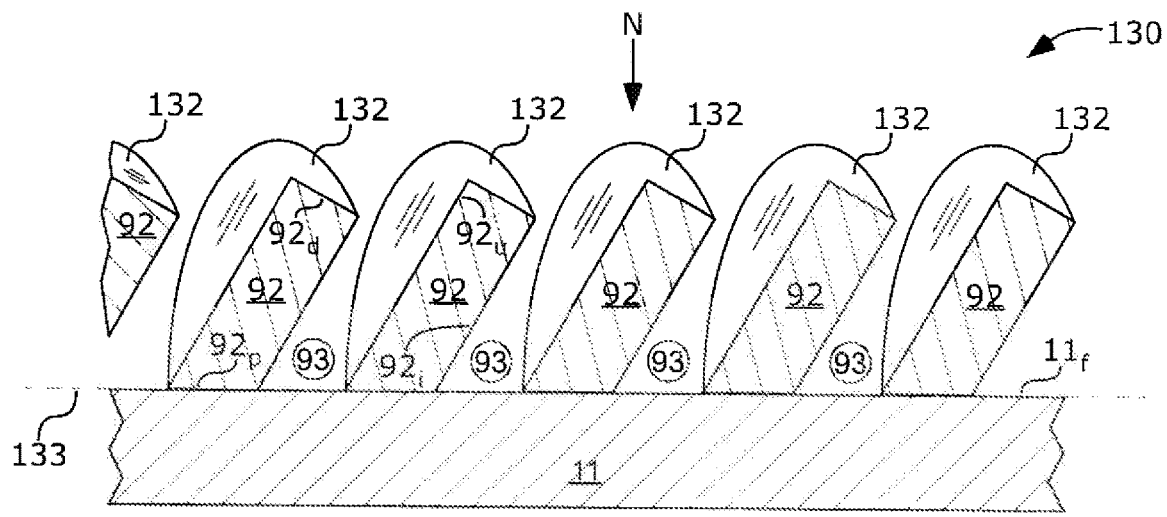

FIG. 13 is a schematic, cross-sectional side-view of an optical device 130, such as for example a wire grid polarizer (WGP), similar to optical devices 90 and 110, but optical device 130 further comprising a wire 132 on the upper-side $92_u$ and the distal end $92_d$ of each support-rib 92, in accordance with an embodiment of the present invention.

Figure 14:
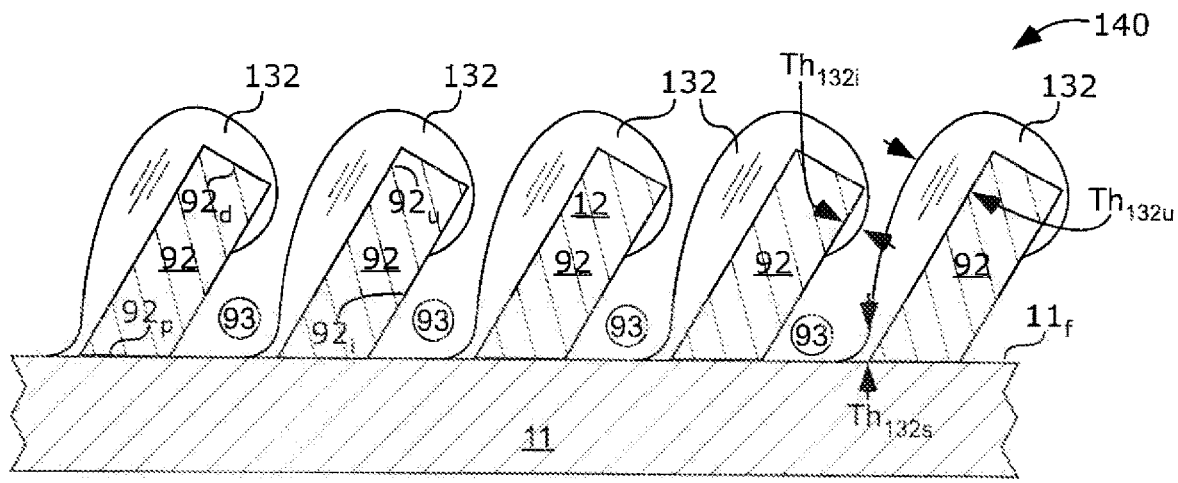

FIG. 14 is a schematic, cross-sectional side-view of an optical device 140, similar to optical device 130, but optical device 140 further comprising some of the wire 132 on the inner-sides $92_i$ of the support-ribs 92, with maximum thickness $Th_{132i}$, and some of the wire 132 on the face $11_f$ of the substrate 11 in the channels 93, with maximum thickness $Th_{132s}$, in accordance with an embodiment of the present invention.

Figure 15:
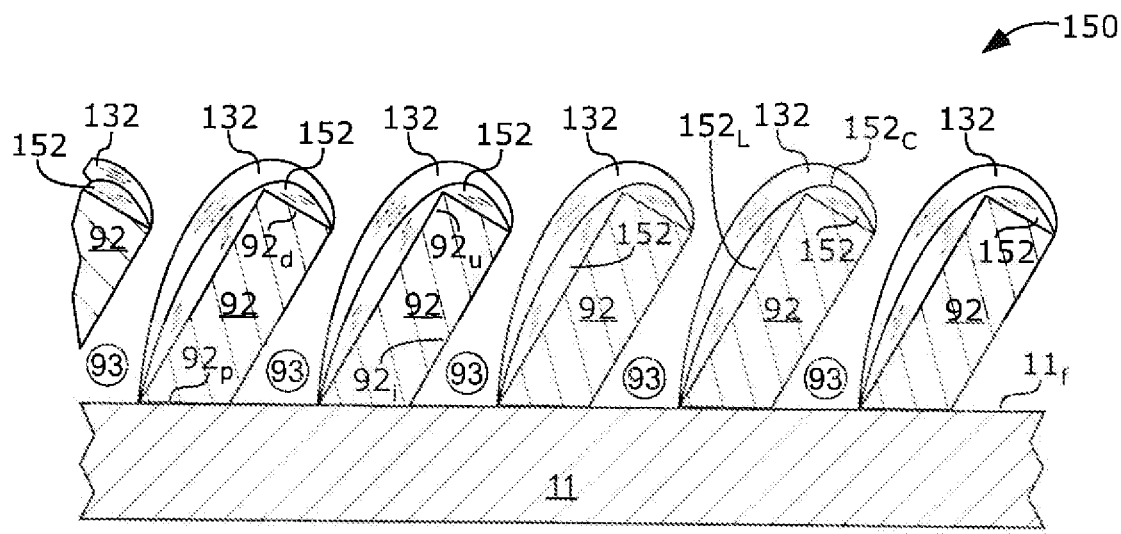

FIG. 15 is a schematic, cross-sectional side-view of an optical device 150, similar to optical devices 130 and 140, but optical device 150 further comprising a cap 152 on the upper-side $92_u$ and the distal end $92_d$ of each support-rib 92 and sandwiched between the wire 132 and the support-rib 92, in accordance with an embodiment of the present invention.

Figure 16:
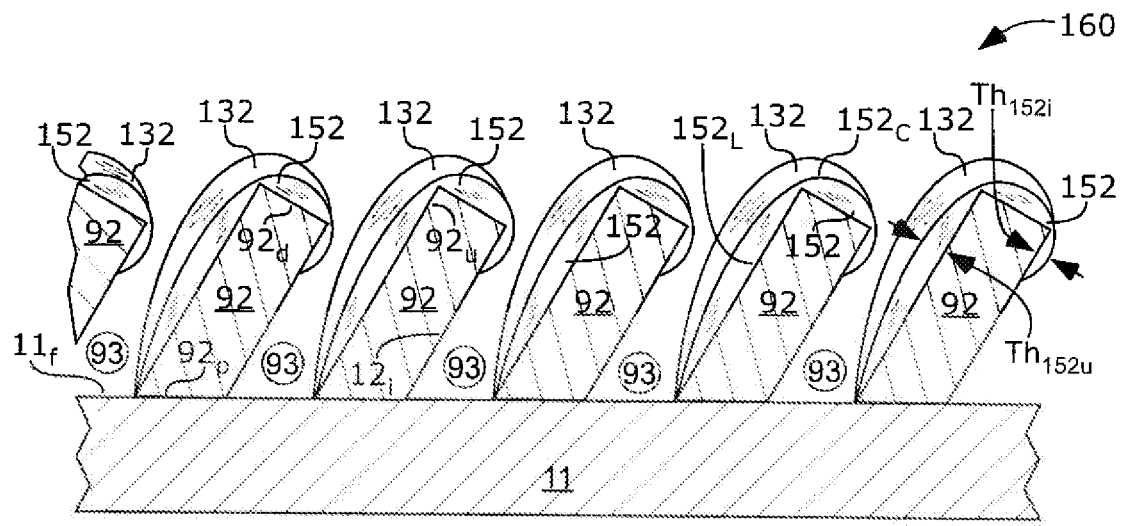

FIG. 16 is a schematic, cross-sectional side-view of an optical device 160, similar to optical device 150, but optical device 160 further comprising some of the cap 152 on at least part of the inner-sides $92_i$ of the support-ribs 92, in accordance with an embodiment of the present invention.

Figure 17:
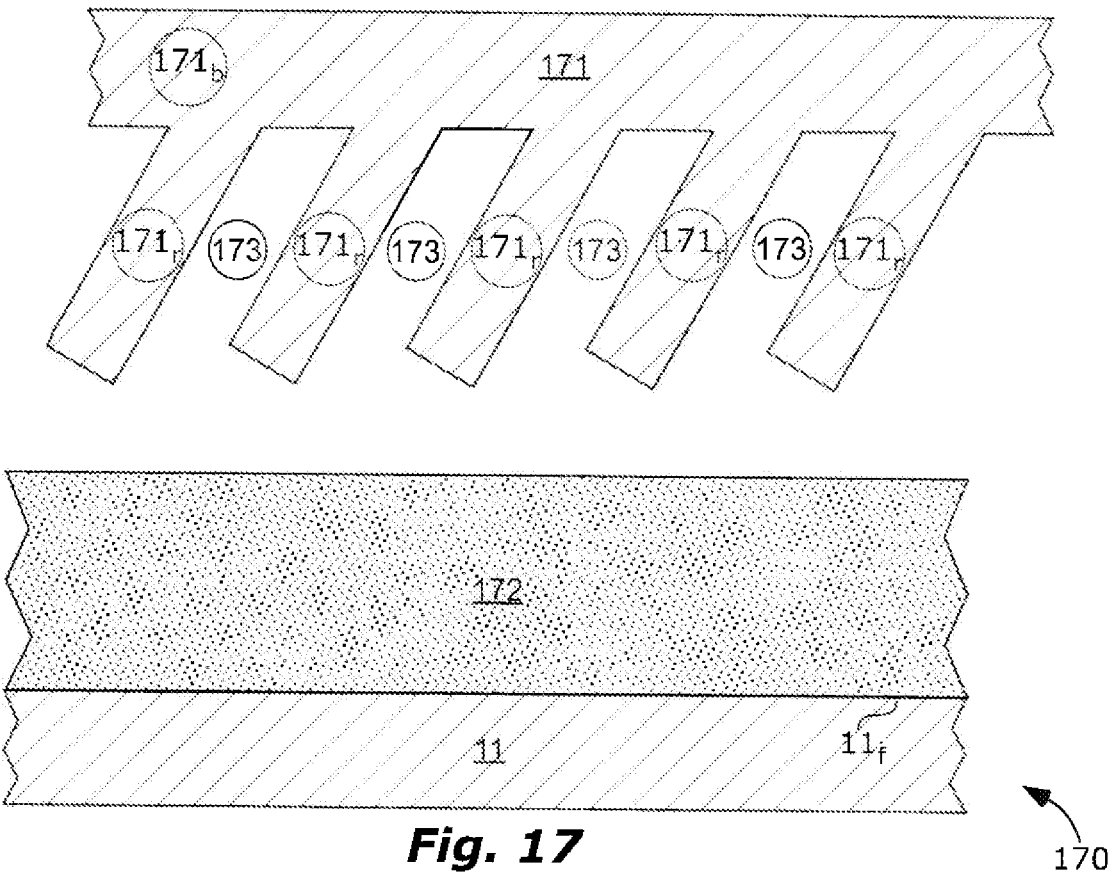

FIG. 17 is a schematic, cross-sectional side-view illustrating a step 170 in a method of making an optical device, including applying an uncured layer 172 on a face $11_f$ of a substrate 11, in accordance with an embodiment of the present invention.

Figure 18:
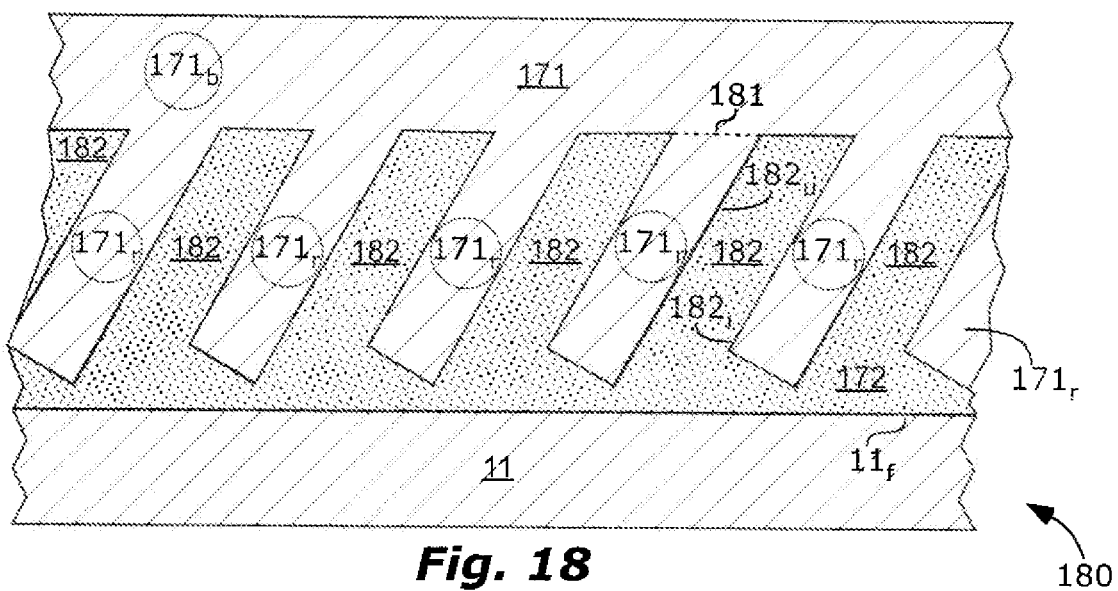

FIG. 18 is a schematic, cross-sectional side-view illustrating a step 180 in a method of making an optical device, which can follow step 170, including imprinting a pattern of uncured support-ribs 182 in the uncured layer 172 with sides $182_i$ and $182_u$ of the uncured support-ribs 92 inclined to one side, in accordance with an embodiment of the present invention.

Figure 19:
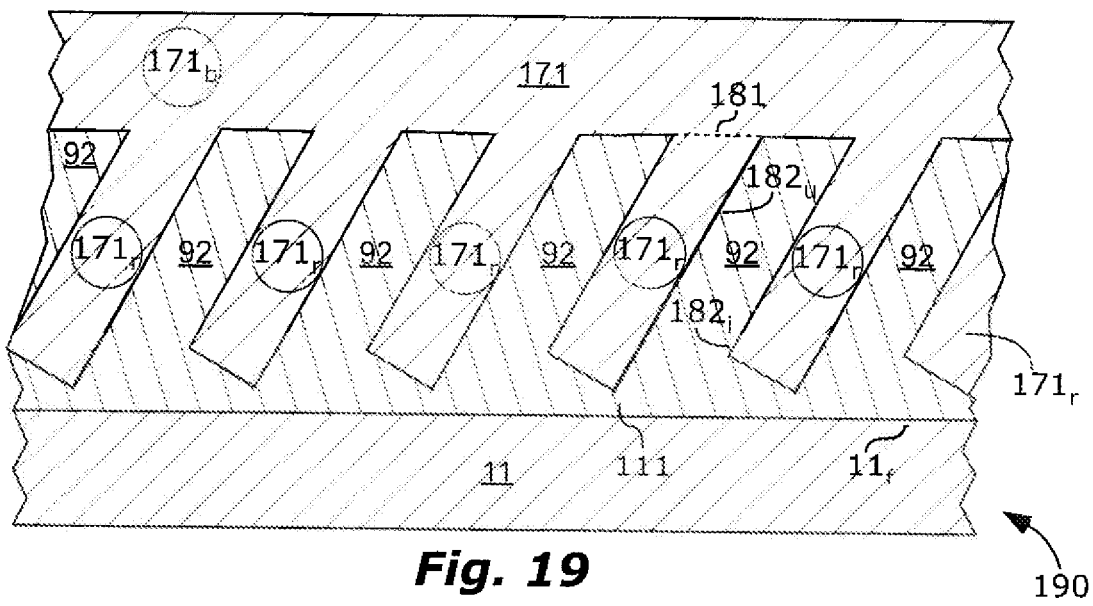

FIG. 19 is a schematic, cross-sectional side-view illustrating a step 190 in a method of making an optical device, which can follow step 180, including curing the uncured layer 172 to form solid, cured support-ribs 92, in accordance with an embodiment of the present invention.

Figure 20:
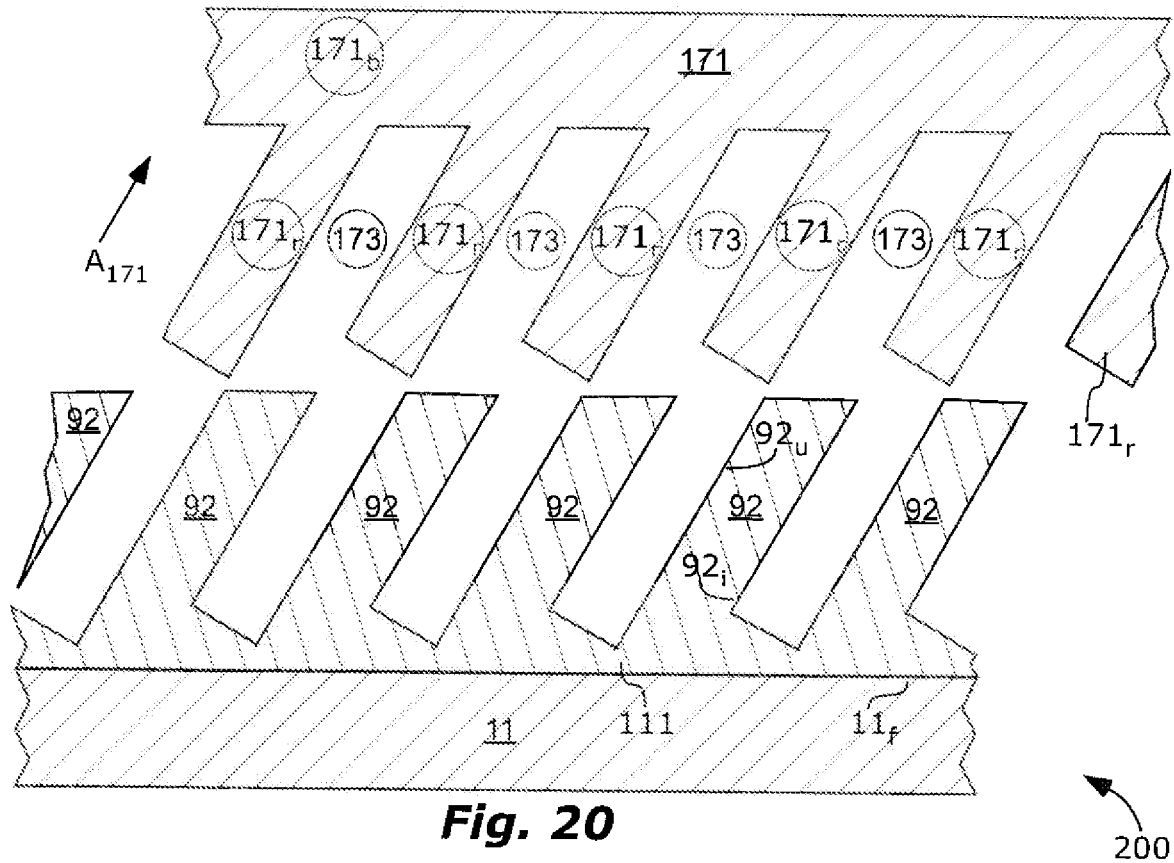

FIG. 20 is a schematic, cross-sectional side-view illustrating a step 200 in a method of making an optical device, which can follow step 190, including removing a stamp 171 at an oblique angle $A_{171}$ with respect to the face $11_f$ of the substrate 11, in accordance with an embodiment of the present invention.

Figure 21:
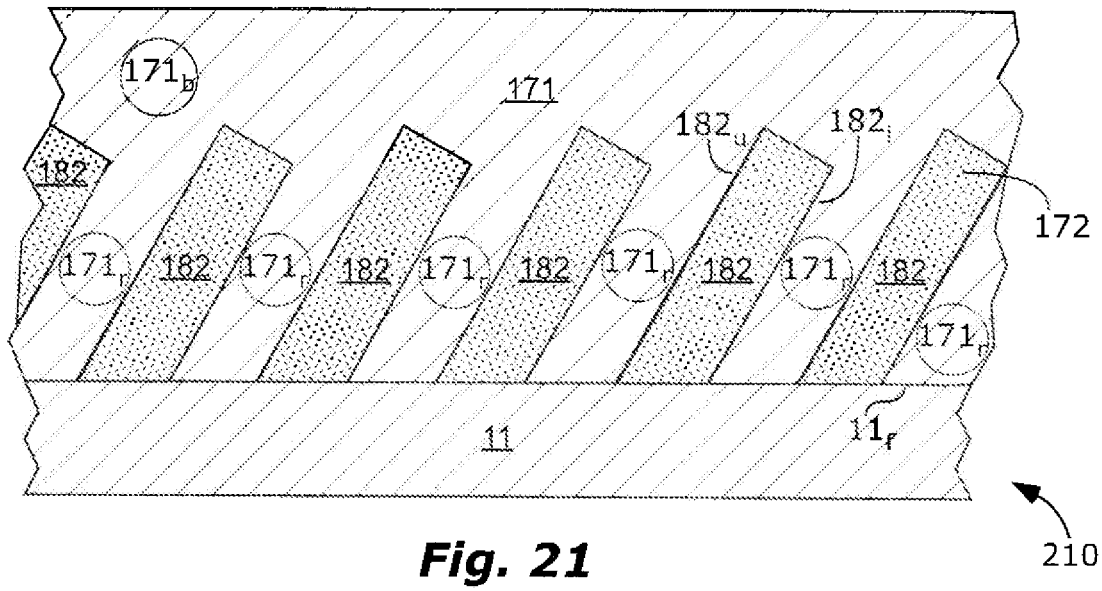

FIG. 21 is a schematic, cross-sectional side-view illustrating a step 210 in a method of making an optical device, which can follow step 170 (but with different shaped stamp-ribs $171_r$ than illustrated in FIG. 17), including imprinting a pattern of uncured support-ribs 182 in the uncured layer 172 with sides $182_i$ and $182_u$ of the uncured support-ribs 92 inclined to one side, in accordance with an embodiment of the present invention.

Figure 22:
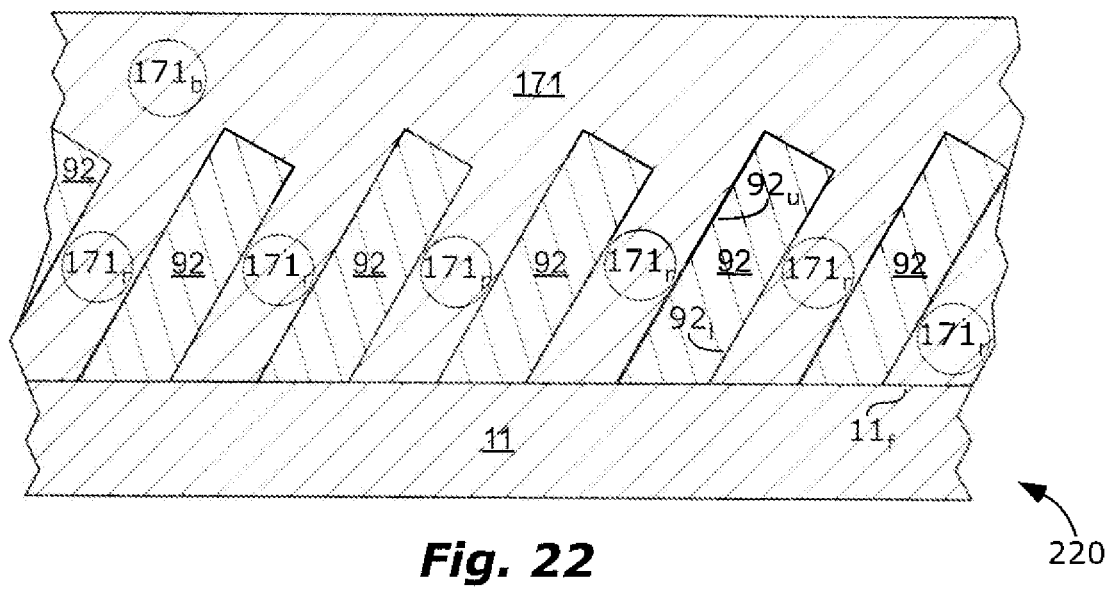

FIG. 22 is a schematic, cross-sectional side-view illustrating a step 220 in a method of making an optical device, which can follow step 210, including curing the uncured layer 172 to form solid, cured support-ribs 92, in accordance with an embodiment of the present invention.

Figure 23:
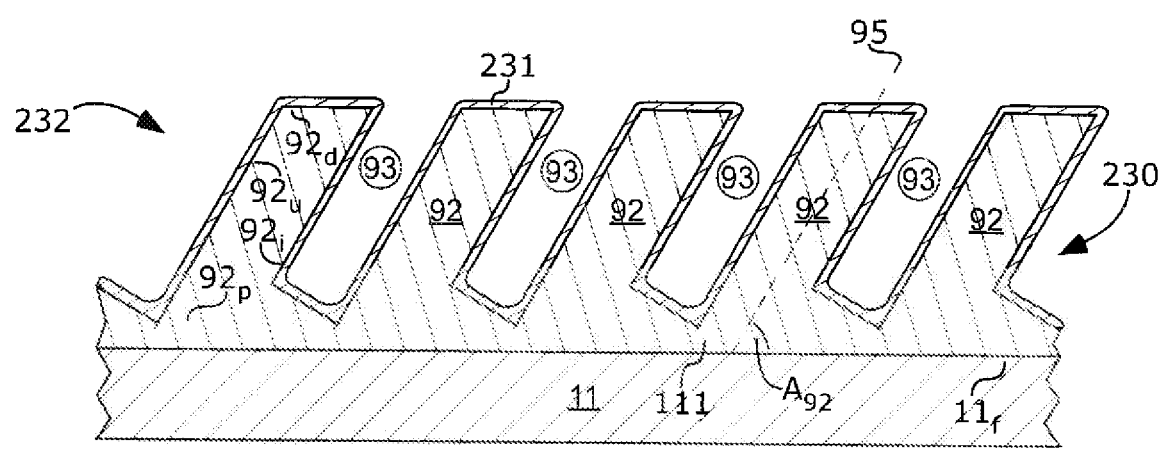

FIG. 23 is a schematic, cross-sectional side-view illustrating a step 230 in a method of making an optical device, which can follow any of steps 190, 200, or 220, including applying a conformal layer 231 on cured support-ribs 92, in accordance with an embodiment of the present invention.

DEFINITIONS

The following definitions, including plurals of the same, apply throughout this patent application.

As used herein, the term "conformal layer" means a thin film which conforms to the contours of feature topology. For example, a thickness across the entire conformal layer can have a minimum value $\geq 1$ nm and a maximum value $\leq 20$ nm. As another example, the maximum value divided by the minimum value $\geq 1$ nm of the thickness of the conformal layer can be $\leq 20$, $\leq 10$, $\leq 5$, or $\leq 3$. As another example, the conformal layer at a distal end of each wire can be separate from the conformal layer at a distal end of adjacent wires, the distal end being a farthest end of the wires from the substrate.

As used herein, the term "elongated" means that a length (length of the ribs into the page) is substantially greater than width or thickness (e.g. length can be $\geq 10$ times, $\geq 100$ times, $\geq 1000$ times, or $\geq 10,000$ times larger than width, thickness, or both).

As used herein, the term "nm" means nanometer(s).

As used herein, the term "normal angle deposition" means deposition at an angle of 90°+/−10° with respect to a plane 133 of a surface on which the material is deposited. See FIG. 13.

As used herein, the term "on" means located directly on or located above with some other solid material between.

As used herein, the term "parallel" means exactly parallel, parallel within normal manufacturing tolerances, or nearly parallel, such that any deviation from exactly parallel would have negligible effect for ordinary use of the device.

As used herein, the same material composition between different parts of the WGP means exactly the same, the same within normal manufacturing tolerances, or nearly the same, such that any deviation from exactly the same would have negligible effect for ordinary use of the device.

Unless explicitly noted otherwise herein, all temperature-dependent values are such values at 25° C.

Materials used in optical structures can absorb some light, reflect some light, and transmit some light. The following definitions distinguish between materials that are primarily absorptive, primarily reflective, or primarily transparent. Each material can be considered to be absorptive, reflective, or transparent in a wavelength range of intended use, across the ultraviolet spectrum, across the visible spectrum, across the infrared spectrum, or combinations thereof, and can have a different property in a different wavelength range. Materials are divided into absorptive, reflective, and transparent based on reflectance R, the real part of the refractive index n, and the imaginary part of the refractive index/extinction coefficient k. Equation 1 is used to determine the reflectance R of the interface between air and a uniform slab of the material at normal incidence:

$$R = \frac{(n-1)^2 + k^2}{(n+1)^2 + k^2} \qquad \text{Equation 1}$$

Unless explicitly specified otherwise herein, materials with $k \leq 0.1$ in the wavelength range are "transparent" materials, materials with $k > 0.1$ and $R \leq 0.6$ in the specified wavelength range are "absorptive" materials, and materials with $k > 0.1$ and R>0.6 in the specified wavelength range are "reflective" materials. If explicitly so stated in the claims, materials with k>0.1 and R≥0.7, R≥0.8, or R≥0.9, in the specified wavelength range, are "reflective" materials.

As used herein, the ultraviolet spectrum means≥10 nm & <400 nm, the visible spectrum means≥400 nm & <700 nm, and the infrared spectrum means≥700 nm & ≤1 mm.

DETAILED DESCRIPTION

Five or six support-ribs 22 or 92 are illustrated in the figures and described herein, but there can be many more support-ribs 22 or 92 than six, or there can be fewer support-ribs 22 or 92 than five, such as for example two or three, particularly if the optical device is a waveguide.

First Method, FIGS. 1-8

A first method of making a wire grid polarizer (WGP), illustrated in FIGS. 1-8, can comprise some or all of the following steps, which can be performed in the following order or other order if so specified. There may be additional steps not described below. These additional steps may be before, between, or after those described. The WGP can be formed without etching.

The first method can comprise: step 10 (FIG. 1), applying an uncured layer 12 on a substrate 11; step 20 (FIG. 2), imprinting support-ribs 22 in the uncured layer 12 with a stamp 13; step 30 (FIG. 3), curing the uncured layer 12 to form a cured layer 32; and step 40 (FIG. 4), removing the stamp 13, leaving support-ribs 22 in the cured layer 32 with channels 41 between adjacent support-ribs 22. Each support-rib 22 can be connected to adjacent support-ribs 22 by material of the support-ribs 22.

In one embodiment, the uncured layer 12 can be a liquid with solid inorganic nanoparticles dispersed throughout a continuous phase, and the cured layer 32 can include a solid, interconnecting network of the inorganic nanoparticles. In another embodiment, the uncured layer 12 can be a colloidal suspension including a dispersed phase and a continuous phase, and curing the uncured layer 12 can include removing the continuous phase to form a solid, defining the cured layer 32.

In another embodiment, the uncured layer 12 can be a solution including molecules in a solvent. The solvent can include water and an organic liquid. The molecules can include metal atoms bonded to reactive groups. Each reactive-group can be —Cl, —$OR^1$, —$OCOR^1$, or —$N(R^1)_2$. Each $R^1$ can be an alkyl group, such as for example —$CH_3$, —$CH_2CH_3$, or —$CH_2CH_2CH_3$. Curing the uncured layer 12 can include reacting the molecules to form a solid of the metal atoms interconnected with each other, defining the cured layer 32.

The first method can further comprise depositing an upper rib 53, or a stack of upper ribs 53, on the distal end D of each of the support-ribs 22 (see steps 50, 60a or 60b, 70, 80, or combinations thereof in FIGS. 5-8). Example combinations of these steps, following steps 10, 20, 30, and 40, include: step 50; steps 50 then 60b; steps 50, 60b, then 70; steps 50, 60b, 70, then 80; step 60a; steps 60a then 70; steps 60a, 70, then 80.

Step 50 can include depositing a cap 52 on each support-rib 22 at a distal end D of each support-rib 22 farthest from the substrate 11. The cap 52 can be sputter deposited. The cap 52 can be transparent (e.g. across the ultraviolet spectrum, across the visible spectrum, across the infrared spectrum, or combinations thereof).

The cap 52 can be wider than the support-rib 22 at or near the distal end D in order to block part or all of the channels 41, and thus minimize or prevent later-deposited upper ribs 53 from being deposited in the channels 41. For example, $1.1 \leq W_C/W_{SR}$, $1.2 \leq W_C/W_{SR}$, $1.4 \leq W_C/W_{SR}$, $1.6 \leq W_C/W_{SR}$, $1.8 \leq W_C/W_{SR}$, or $1.9 \leq W_C/W_{SR}$; and $W_C/W_{SR} \leq 2.1$, $W_C/W_{SR} \leq 2.4$, $W_C/W_{SR} \leq 2.8$, $W_C/W_{SR} \leq 3.5$, $W_C/W_{SR} \leq 4$, or $W_C/W_{SR} \leq 6$, where $W_C$ is a width of the cap 52 measured at the distal end D of the support-rib 22, and $W_{SR}$ is a width of the support-rib 22 measured at 20% of a distance from the distal end D of the support-rib 22 towards a proximal end P of the support-rib 22 closest to the substrate 11.

Step 60a can follow step 40 and can include depositing a wire 62 on each support-rib 22 at a distal end D of each support-rib 22 farthest from the substrate 11. Step 60b can follow step 50 and can include depositing a wire 62 on each cap 52. Example deposition methods of the wire 62 include sputter deposition or evaporation deposition. The wire 62 can be reflective (e.g. across the ultraviolet spectrum, across the visible spectrum, across the infrared spectrum, or combinations thereof). Steps 60a and 60b can be performed before or after the following steps 70 and 80.

Step 70 can follow step 60a or step 60b and can include depositing a lower rib 72 on each wire 62. The lower rib 72 can have a real part of a refractive index $n_L \leq 1.6$, $n_L \leq 1.5$, $n_L \leq 1.4$, $n_L \leq 1.3$, or $n_L \leq 1.2$ and an extinction coefficient $k_L \leq 0.1$, $k_L \leq 0.01$, or $k_L \leq 0.001$. Step 80 can follow step 70 and can include depositing a top rib 82 on each lower rib 72. The top rib 82 can have a real part of a refractive index $n_T \geq 1.6$, $n_T \geq 1.7$, $n_T \geq 1.9$, $n_T \geq 2.1$, or $n_T \geq 2.3$ and an extinction coefficient $k_T \leq 0.1$, $k_T \leq 0.01$, or $k_T \leq 0.001$. The refractive indices and extinction coefficients of this paragraph can be such values across the ultraviolet spectrum, across the visible spectrum, across the infrared spectrum, or combinations thereof.

Depositing the stack of upper ribs 53 can include depositing the upper ribs 53 such that one, some, or all of the upper ribs 53 are separate from associated upper ribs 53 on adjacent support-ribs 22. A bottom $41_b$ of the channels 41 can be free of material of the upper ribs 53. The bottom $41_b$ of the channels 41 can be free of material of the caps 52, the wires 62, the lower ribs 72, the top ribs 82, or combinations thereof. Depositing the caps 52 can include depositing each cap 52 such that it is separate from caps 52 on adjacent support-ribs 22. Depositing the wires 62 can include depositing each wire 62 such that it is separate from wires 62 on adjacent support-ribs 22. Depositing the lower ribs 72 can include depositing each lower rib 72 such that it is separate from lower ribs 72 on adjacent support-ribs 22. Depositing the top ribs 82 can include depositing each top rib 82 such that it is separate from top ribs 82 on adjacent support-ribs 22. Deposition of any of the upper ribs 53 with separation from associated upper ribs 53 on adjacent support-ribs 22 can be achieved as described in the "FIRST AND SECOND METHODS, WIRE SEPARATION" section below.

The support-ribs 22, the upper ribs 53, the caps 52, the wires 62, the lower ribs 72, the top ribs 82, or combinations thereof, can have a curved cross-sectional shape at a distal end D farthest from the substrate 11. This curved cross-sectional shape can be a parabolic or half-elliptical cross-sectional shape. The curved cross-sectional shape can improve WGP performance, such as by increasing transmission of a predominantly-transmitted polarization.

The cap 52 can extend down sides S of the support-rib 22, the wire 62 can extend down sides S of the cap 52, the lower rib 72 can extend down sides S of the wire 62, the top ribs 82 can extend down sides S of the lower ribs 72, or combinations thereof. The curved cross-sectional shape combined with the upper ribs 53 extending down sides of the lower, adjacent rib in the stack can improve manufacturing throughput because this shape can allow a thinner layer to achieve the same polarization effect.

The support-ribs 22 can have a low index of refraction ($n_{22}$) for improved optical performance, especially at low wavelengths, such as for example: $n_{22} \leq 1.4$, $n_{22} \leq 1.3$, $n_{22} \leq 1.2$, or $n_{22} \leq 1.1$. Furthermore, the index of refraction ($n_{22}$) of the support-ribs 22 can be less than an index of refraction ($n_{11}$) of the substrate 11, less than an index of refraction ($n_{52}$) of the cap 52, or both.

One way of achieving this low index of refraction is to include small voids or cavities in the cured layer 32. These small voids, filled with air, lower the overall index of refraction of the cured layer 32. For example, the cured layer 32 can include silicon dioxide, with an index of refraction of around 1.4-1.5, but with the voids, the overall index of refraction can be <1.4. These voids can be formed by use of a solvent in the uncured layer 12 which has larger molecules. For example, a chemical in a solvent in the uncured layer 12 can have a molecular weight of ≥70 g/mol, ≥80 g/mol, ≥90 g/mol, ≥100 g/mol, or ≥110 g/mol. As another example, a chemical in this solvent can have a large number of atoms in each molecule, such as for example ≥15 atoms, ≥20 atoms, or ≥25 atoms. It can be useful for chemicals in this solvent to not have too high of a molecular weight so that it can be sufficiently volatile, Therefore, all chemicals this solvent can have a molecular weight of ≤125 g/mol, ≤150 g/mol, ≤175 g/mol, ≤200 g/mol, or ≤300 g/mol. All molecules in this solvent can include ≤30 atoms, ≤50 atoms, or ≤75 atoms. Further, this solvent can have a structure which occupies larger space, such as an aryl molecule or otherwise a molecule with double bonds. For example, the uncured layer 12 can include benzene or xylene. Thus, the support-ribs 22 can include organic moieties. For example, ≥0.1%, ≥1%, or ≥10% and ≤15%, ≤25%, or ≤50% of atoms in the support-ribs 22 can be part of organic moieties.

The support-ribs 22 and the caps 52 can have the same or similar material composition. For example, ≥60%, ≥75%, ≥85%, or ≥90%; and ≤92%, ≤95%, or ≤99%; of a material composition of the support-ribs 22 can be the same as a material composition of the caps 52. An inorganic portion of the support-ribs 22 can be the same as an inorganic portion of the caps 52. Thus, a difference in the material composition between the support-ribs 22 and the caps 52 can be added organic moieties in the support-ribs 22.

First Optical Device, FIGS. 5-8

A wire grid polarizer (WGP) can be formed by the first method described above, and consequently can include a broader variety of materials (even those difficult to etch) and thus potentially improved performance, durability, or both. The WGP can also be made at a lower cost due to avoidance or reduction of etch. The WGP, and components of the WGP, can have properties as described above.

As illustrated in FIGS. 5-8, the WGP can include an array of support-ribs 22 on a substrate 11, and an upper rib 53 or a stack of upper ribs 53 on the distal end D of each of the support-ribs 22. The support-ribs 22 and the stack of upper ribs 53 can be parallel and elongated, with a length extending into the pages of the drawings. Alternatively, the support-ribs 22 and the stack of upper ribs 53 can extend in variable directions, like a metamaterial polarizer for example.

The upper rib 53 or a stack of upper ribs 53 can include one upper rib 53 (FIGS. 5 and 6a), two ribs 53 (FIG. 6b), three upper ribs 53 (FIG. 7), four upper ribs 53 (FIG. 8), or >four upper ribs 53. In one embodiment, the stack of upper ribs 53 can include the following upper ribs 53 in the following order moving outwards from the support-ribs 22: the cap 52, the wire 62, the lower rib 72, and then the top rib 82. In another embodiment, the stack of upper ribs 53 can include the following upper ribs 53 in the following order moving outwards from the support-ribs 22: the wire 62, the lower rib 72, and then the top rib 82. In another embodiment, the upper rib 53 can include the wire 62.

Second Optical Device, with Slanted Support-Ribs 92

As illustrated in FIGS. 9-16 and 23, optical devices 90, 110, 120, 130, 140, 150, 160, and 230 are shown comprising an array of parallel, elongated support-ribs 92 on a face $11_f$ of a substrate 11 with channels 93 between adjacent support-ribs 92. Each support-rib 92 can have a cross-sectional profile with a proximal end $92_p$ closest to the substrate 11 and a distal end $92_d$ opposite of the proximal end $92_p$. The distal end $92_d$ can be farthest from the substrate 11. Each support-rib 92 can also have sides $92_i$ and $92_u$ facing the channels 93 and extending from the proximal end $92_p$ to the distal end $92_d$. The channels 93 can include an air-filled region extending along a length of the channels 93, the length of the channels 93 being a longest dimension of the channels.

As illustrated in FIGS. 13-16, optical devices 130, 140, 150, and 160 can each be a wire grid polarizer (WGP) with a wire 132 on the upper-side $92_u$ and the distal end $92_d$ of each support-rib 92. The wires 132 can be parallel and elongated. To facilitate polarization, each wire 132 can be separate from wires 132 on adjacent support-ribs 92. The following discussion of the shape of the support-ribs 92 and the added cap 152 can be helpful for ensuring or improving separation of wires 132 on separate support-ribs 92, even with wire 132 deposition from normal incidence (see FIG. 13).

The sides of the support-ribs 92 can include an inner-side 92; which leans towards and faces the substrate 11, and an upper-side $92_u$, opposite of the inner-side $92_i$ and not facing the substrate 11 or facing away from the substrate 11. This leaning or slanting of the support-ribs 92 can facilitate deposition of wires 132 (particularly by normal-angle deposition) on the upper-side $92_u$, on the distal end $92_d$, or both, with each wire 132 being separate from wires 132 on adjacent support-ribs 92. In one embodiment, all support-ribs 92 can lean in a single direction.

The lean or slant of the support-ribs 92 can be quantified by angles $A_{92}$, $A_{pi}$, and $A_{pu}$. Angle $A_{92}$ is a smallest angle between a plane 95 (FIGS. 9-12) and the face $11_f$ of the substrate 11. The plane 95 extends along a length L (FIG. 10) of each support-rib 92 through a center of the support-rib 92 from the proximal end $92_p$ to the distal end $92_d$. Example values for $A_{92}$ include $5° \leq A_{92}$, $15°: A_{92}$, $25° \leq A_{92}$ $40° \leq A_{92}$, or $60° \leq A_{92}$; and $A_{92} \leq 45°$, $A_{92} \leq 60°$, $A_{92} \leq 75°$, or $A_{92} \leq 85°$. AP, is an external angle between the inner-side $92_i$ and the face $11_f$ of the substrate 11. Example values for $A_{pi}$ include $5° \leq A_{pi}$, $15° \leq A_{pi}$, $25° \leq A_{pi}$, $35° \leq A_{pi}$, $45° \leq A_{pi}$, $55° \leq A_{pi}$, or $65° \leq A_{pi}$; and $A_{pi}$, $45°$, $A_{pi} \leq 55°$, $A_{pi}$, $\leq 65°$, $A_{pi} \leq 75°$, or $A_{pi} \leq 85°$. $A_{pu}$ is an external angle between the upper-side $92_u$ and the face $11_f$ of the substrate 11. Example values for $A_{pu}$ include $95° \leq A_{pu}$, $105° \leq A_{pu}$, $115° \leq A_{pu}$, $130° \leq A_{pu}$, or $150° \leq A_{pu}$; and $A_{pu}$ $135°$, $A_{pu}$ $150°$, $A_{pu} \leq 165°$, or $A_{pu} \leq 175°$. $A_{pi} - A_{pu}$ can be related as follows: $|180° - A_{pi} - A_{pu}| \leq 2°$, $|180° - A_{pi} - A_{pu}| \leq 5°$, $|180° - A_{pi} - A_{pu}| \leq 10°$, $|180° - A_{pi} - A_{pu}| \leq 20°$, or $|180° - A_{pi} - A_{pu}| \leq 30°$.

If the optical device is a wire grid polarizer (WGP) with wires 132, then angles $A_{92}$, $A_{pi}$, and $A_{pu}$ can be selected, along with size and spacing between the support-ribs 92, to keep each wire 132 separate from wires 132 on adjacent support-ribs 92. In the following equation, $L_c$ (FIG. 9) is a straight-line distance, from one support-rib 92 to an adjacent support-rib 92 in the channel, parallel to the face $11_f$ of the substrate 11, and $L_i$ (FIG. 9) is a straight-line distance of the inner-side $92_i$ from the proximal end $92_p$ to the distal end $92_d$. Typically, $L_c$ is selected based on needed WGP performance (e.g. balance of Tp and Ts), and $L_i$ is selected based on needed support-rib 92 structural strength. Angle $A_{92}$ can then be calculated from the following equation: $A_{92}=\cos^{-1}(L_c/L_i)$. This value of $A_{92}$ can result in the support-ribs 92 blocking the face $11_f$ of the substrate 11 in the channels 11 from normal angle deposition of the wires 132. It might not be needed or desirable to achieve the exact $A_{92}$ value noted above. Variation from such angle can be quantified by the equation $A_{92}=\cos^{-1}(X \cdot L_c/L_i)$. Values of "X" for different circumstances are described in the following two paragraphs.

Partial blocking of the channels 11 might be acceptable, if some deposition of the wires 132 in the channels 93 is allowed in the specific WGP design, or if deposition is performed at an oblique angle with deposition target facing the upper-side $92_u$. Example ranges of X, for use in the equation $A_{92}=\cos^{-1}(X \cdot L_c/L_i)$, include $X \leq 0.95$, $X \leq 0.9$, $X \leq 0.8$, $X \leq 0.7$, $X \leq 0.6$, $X \leq 0.5$, $X \leq 0.4$, or $X \leq 0.2$.

For some designs, particularly for high transmission of the predominantly-transmitted polarization (e.g. high Tp), partial coverage of the upper-side $92_u$, the distal end $92_d$, or both with the wires 132 can be helpful. This can be achieved by increasing X to decrease $A_{92}$. Example ranges of X, for use in the equation $$A_{92} = \cos^{-1}\left(\frac{X * L_c}{L_i}\right),$$

include $X \geq 1.03$, $X \geq 1.05$, $X \geq 1.1$, $X \geq 1.15$, or $X \geq 1.2$.

Angles $A_{di}$ and $A_{du}$ at the distal end $92_d$ of the support-rib 92 can be selected, and formed by shape of the stamp 171 described below, for desired blocking of the channels 93 during deposition, WGP durability, and reduced manufacturing cost. $A_{di}$ is an internal angle between the inner-side 92; and the distal end $92_d$. $A_{du}$ is an internal angle between the upper-side $92_u$ and the distal end $92_d$.

For example, $A_{di}$ and $A_{du}$ can be close to 90° as shown in FIGS. 9-10. This design can improve support-rib 92 durability and can reduce stamp 171 cost. Alternatively, as illustrated in FIG. 11, $A_{di}$ can be <90° (e.g. $A_{di}$<90°, $A_{di}$ ≤80°, $A_{di}$≤70°, $A_{di}$≤60°, or $A_{di}$≤50°; and $A_{di}$≥10°); and $A_{du}$ can be >90° (e.g. $A_{du}$>90°, $A_{du}$≥100°, $A_{du}$≥110°, $A_{du}$≥120°, $A_{du}$≥130°; and $A_{du}$≤180°), thus extending the inner-side 92 at the distal end $92_d$ over the channel 93. This design can improve blocking of the face $11_f$ of the substrate 11 during deposition of the wires 132.

Channel angle $A_c$ is illustrated in FIGS. 9 and 11. The channel angle $A_c$ is an angle between sides $92_i$ and $92_u$ of the support-ribs 92 and the face $11_f$ of the substrate 11 in the channels 93. As illustrated in FIG. 9, in each channel 93, one channel angle $A_c$ can be <90° and the other channel angle $A_c$, on an opposite side of the channel, can be >90°. Alternatively, as illustrated in FIG. 11, in each channel 93, both channel angles $A_c$ can be≈90°, such as for example 90°+/−5°, 90°+/−10, 90°+/−15°, or 90°+/−20°. The embodiment of FIG. 11, with both channel angles $A_c$≈90°, may be preferred due to increased performance resulting from increased channel 93 depth.

The following further describes how the aforementioned angles are defined or interpreted. Any angle described as an "external angle" is measured external to the support-rib 92. As illustrated in FIG. 12, if the sides $92_i$ and $92_u$ are curved, then side-line 121 is used to determine angles $A_{pi}$ and $A_{pu}$. Side-lines 121 are aligned with a narrowest dimension of the side $92_i$ or $92_u$ and at an angle to align with an average direction of the side $92_i$ or $92_u$. If angles $A_{pi}$ and $A_{pu}$ cannot be precisely and repeatedly determined across the optical device, such as due to curvature of the substrate or roughness of the face $11_f$ of the substrate 11, then these angles $A_{pi}$ and $A_{pu}$ are measured at a substrate-line 123 extending through a core of the substrate 11. The substrate-line 123 has a direction that is an average of the face $11_f$ of the substrate 11, or an average of a side $11_s$ of the substrate 11 opposite of the face $11_f$, whichever has the smoothest surface. If the distal end $92_d$ is curved, then distal-line 122 is used to determine angles $A_{di}$ and $A_{du}$. Distal-line 122 extends between locations where the two side-lines 121 exit the distal end $92_d$.

In summary, distance $L_c$, distance $L_i$, angle $A_{92}$, value X in the equation $$A_{92} = \cos^{-1}\left(\frac{X * L_c}{L_i}\right),$$

and angles $A_{di}$ and $A_{du}$ at the distal end $92_d$, can be selected for partial or complete blocking of the face $11_f$ of the substrate 11 in the channels 93 by the support-ribs 92 as viewed from perpendicular to the face $11_f$ of the substrate 11. See line 94 in FIG. 9, indicating this complete blocking. Complete blocking of the channels 93, as viewed from perpendicular to the face $11_f$ of the substrate 11, can result in negligible or no wires 132 on the inner-side $92_i$ of each support-rib 92, on the substrate 11 in the channels 93, or both, as illustrated in FIG. 13.

Alternatively, as illustrated in FIG. 14, the wires 132 can enter the channels 93 and cover part of the inner-side $92_i$ of each support-rib 92, part of the substrate 11 in the channels 93, or both. For example, ≥50%, ≥75%, or ≥90% of the inner-side $92_i$ of each support-rib 92, the substrate 11 in the channels 93, or both can be free of material of the wires 132, and the other portion can be coated with the wire 132.

If the wire 132 does cover part of the inner-side $92_i$, part of the substrate 11 in the channels 93, or both, it can cover it with a small thickness due to blocking effect of the slanted support-ribs 92. For example, $Th_{132i} \leq 10$ nm, $Th_{132i} \leq 20$ nm, or $Th_{132i} \leq 50$ nm, where $Th_{132i}$ is a maximum thickness of the wires 132 on the inner-sides $92_i$, measured perpendicular to the inner-side $92_i$. As another example, $Th_{132u}/Th_{132i} \geq 2$, $Th_{132u}/Th_{132i} \geq 5$, $Th_{132u}/Th_{132i} \geq 10$, $Th_{132u}/Th_{132i} \geq 20$, where $Th_{132u}$ is a maximum thickness of the wire 132 on the upper-side $92_u$, measured perpendicular to the upper-side. As another example, $Th_{132u}/Th_{132s} \geq 2$, $Th_{132u}/Th_{132s} \geq 5$, $Th_{132u}/Th_{132s} \geq 10$, or $Th_{132u}/Th_{132s} \geq 20$, where $Th_{132s}$ is a maximum thickness of the wire 132 on the face $11_f$ of the substrate 11 in a channel 93 adjacent to the support-rib 92, measured perpendicular to the face $11_f$ of the substrate 11.

As illustrated in FIGS. 15-16, the WGP 150 and 160 can further comprise a cap 152 sandwiched at least partly between each wire 132 and each support-rib 92. A purpose of the cap 152 is to further close off the channel during deposition of the wire 132. Thus, the cap 152 can help to compensate for manufacturing limitations of support-rib 92 length $L_i$ and angle $A_{pi}$. For example, there can be limited wicking of the uncured layer 172 into the stamp 171, thus limiting a depth of stamp-channels 173 (FIGS. 17-18). This limitation can be compensated for by use of the cap 152. Another benefit of the longer support-rib 92 plus cap 152 combination is that this can increase channel 93 length and thus provide a larger region with a reduced effective index of refraction as described in U.S. Pat. No. 6,122,103. It can be helpful for the cap 152 on each support-rib 92 to be separate from (i.e. not touch) the caps 152 on adjacent support-ribs 92. This separation can facilitate deposition of separate wires 132.

As illustrated in FIG. 15, the cap 152 can cover part or all of the upper-side $92_u$, part or all of the distal end $92_d$, or both. As illustrated in FIG. 16, the cap 152 can cover at least part of the inner-side $92_i$ of each support-rib 92. For example, ≥50%, ≥75%, or ≥90% of the inner-side $92_i$ of each support-rib 92 can be free of material of the cap 152, and the other portion can be coated with the cap 152.

Example maximum thicknesses $Th_{152i}$ of the cap 152 on the inner-sides $92_i$, measured perpendicular to the inner-side $92_i$, include $Th_{152i}$≤5 nm, $Th_{152i}$≤10 nm, or $Th_{152i}$≤20 nm. As another example, $Th_{152u}/Th_{152i}$≥2, $Th_{152u}/Th_{152i}$≥5, $Th_{152u}/Th_{152i}$≥10, $Th_{152u}/Th_{152i}$≥20, where $Th_{152u}$ is a maximum thickness of the cap 152 on the upper-side $92_u$, measured perpendicular to the upper-side $92_u$.

Second Method, FIGS. 9-23

A second method of making an optical device, such as a wire grid polarizer (WGP), can comprise some or all of the following steps, which are illustrated in FIGS. 17-23. The second method can be performed in the following order or other order if so specified. Some of the steps can be performed simultaneously unless explicitly noted otherwise in the claims. There may be additional steps not described below. These additional steps may be before, between, or after those described. Components of the optical device, and the optical device itself, can have properties as described above. Any additional description of properties of the optical device in the below second method, not described above, can be applicable to the above described optical device.

The second method can comprise some or all of the following: (a) step 170, applying an uncured layer 172 on a face 11, of a substrate 11 (FIG. 17); (b) step 180 or 210, imprinting a pattern of uncured support-ribs 182 in the uncured layer 172 (FIGS. 18 & 21); (c) step 190 or 220, curing the uncured layer (FIGS. 19 & 22); (d) depositing a cap 152 on the upper-side $92_u$ and the distal end $92_d$ of each support-rib 92 (FIGS. 15 & 16); and (e) depositing a wire 132 on the upper-side $92_u$ of each support-rib 92, on the distal end $92_d$ of each support-rib 92, or both (FIGS. 13-16).

(b) & (c): Imprinting the pattern of support-ribs 92 in the uncured layer 172 can be performed, such as for example with the stamp 171 as described below, to produce leaning support-ribs 92, which can have angles as described above.

As illustrated in FIGS. 18 and 21, imprinting can include pressing a stamp 171 into the uncured layer 172. The stamp 171 can include stamp-ribs 171 mating with the channels 93 and stamp-channels 173 mating with the support-ribs 92.

Due to the leaning shape of the support-ribs 92, it can be difficult to remove the stamp 171 from the support-ribs 92 without damaging them. One methods for removing the stamp 171 from the optical device without damaging the support-ribs 92 is removing the stamp 171 at an angle $A_{171}$ (see FIG. 20), which can be close to $A_{92}$ (see FIGS. 9-12). For example, $A_{171}$ can be within 2°, 5°, 10°, 20°, or 30° of $A_{92}$.

Other methods for removing the stamp 171 from the optical device without damaging the support-ribs 92 are using a stamp 171 that is flexible, using support-ribs 92 that are flexible, or both. The stamp 171 can include an elastic material. The stamp-ribs $171_r$, a base $171_b$ of the stamp 171 attached to the stamp-ribs $171_r$, or both can be elastic. The stamp-ribs $171_r$, a base $171_b$ of the stamp 171 attached to the stamp-ribs $171_r$, or both can comprise polyimide, polydimethylsiloxane, or both. The stamp-ribs $171_r$, a base $171_b$ of the stamp 171 attached to the stamp-ribs $171_r$, the support-ribs 92 when the stamp 171 is removed from the support-ribs 92, or combinations thereof can have a modulus of elasticity ≤6 GPa, ≤3 GPa, ≤1 GPa, or ≤0.1 GPa; and can be ≥0.1 GPa, ≥0.01 GPa, ≥0.005 GPa, ≥0.001 GPa, or >0.0001 GPa. The support-ribs 92 can be flexible by partially curing the uncured layer 172, removing the stamp 171, then finalizing the cure. The partially-cured support-ribs 92 can flex as the stamp 171 is removed.

(c) Curing the uncured layer 172 can including curing the uncured support-ribs 182 into support-ribs 92 that are solid and cured. In one embodiment, the uncured layer 172 can be a liquid with solid inorganic nanoparticles dispersed throughout a continuous phase, the solid inorganic nanoparticles including metal atoms bonded to reactive groups, where each reactive-group is independently —Cl, —$OR^2$, —$OCOR^2$, or —$N(R^2)_2$, and $R^2$ is an alkyl group; and curing can include reacting the molecules to form a solid of the metal atoms interconnected with each other. In another embodiment, the uncured layer 172 can be a liquid with solid inorganic nanoparticles dispersed throughout a continuous phase; and curing can include forming a solid, interconnecting network of the inorganic nanoparticles. In another embodiment, the uncured layer 172 can be a colloidal suspension including a dispersed phase and a continuous phase; and curing the uncured layer 172 can include removing the continuous phase.

(d) & (e): The cap 152, the wires 132, or both can be deposited by sputter deposition, which can facilitate deposition of separation of the caps 152, the wires 132, or both on separate support-ribs 92. The separation of the caps 152, the wires 132, or both on separate support-ribs 92 can improve WGP performance, such as for example increased transmission of the desired polarization (e.g. increase Tp) and reduced transmission of the opposite polarization (e.g. decrease Ts). Sputter deposition of the cap 152 can also result in the cap 152 having a linear profile $152_L$ facing the support-rib 92 and a curved profile $152_C$ facing the wire 132, which can improve WGP performance. This linear profile $152_L$/curved profile $152_C$ can also can improve WPG performance. Deposition of the cap 152, the wires 132, or both can include normal angle deposition, or can even be performed solely by normal angle deposition, Some manufacturing facilities lack equipment for oblique angle deposition, thus such normal angle deposition can allow reduced cost manufacture of WGPs due to avoidance of purchase of additional equipment.

(b) to (e): As illustrated in FIGS. 11 and 18-20, adjacent support-ribs 22 and 92 can be connected at the proximal end $92_p$ by material 111 of the support-ribs 92. This can be accomplished by not pressing the stamp 171 all the way to the substrate. This connection of the support-ribs 92 by material 111 of the support-ribs 92 can increase strength of the support-ribs 92, which can be particularly helpful in the embodiments described herein with inclined or leaning support-ribs 92. Although the support-ribs 92 might be connected at the proximal end $92_p$, each support-rib 92 can be separate from (i.e. not touch) adjacent support-ribs 92 at the distal end $92_d$ and at the sides $92_i$ and $92_u$. This separation can facilitate deposition of separate cap 152, separate wires 132, or both.

The uncured layer 172, the support-ribs 92, the cap 152, or combinations thereof can have a low index of refraction for improved optical performance, such as for example ≤1.1, ≤1.2, ≤1.3, or ≤1.4. In one embodiment, such index of refraction can be 1.0.

One way of achieving this low index of refraction is to include small voids or cavities in the uncured layer 172, which can remain in the support-ribs 92. These small voids, filled with air, can lower the overall index of refraction. For example, the support-ribs 92 can include silicon dioxide, with an index of refraction of around 1.4-1.5, but with the voids, the overall index of refraction can be <1.4. These voids can be formed by use of a solvent in the uncured layer 172 which has larger molecules. For example, a solvent in the uncured layer 172 can have a molecular weight of ≥70 g/mol, ≥80 g/mol, ≥90 g/mol, ≥100 g/mol, or ≥110 g/mol. As another example, a chemical in this solvent can have a large number of atoms, such as for example ≥15 atoms, ≥20 atoms, or ≥25 atoms. It can be helpful for this solvent to not have too high of a molecular weight so that it can be sufficiently volatile. Therefore, this solvent can have a molecular weight of ≤125 g/mol, ≤150 g/mol, ≤175 g/mol, ≤200 g/mol, or ≤300 g/mol. This solvent can also have ≤30 atoms, ≤50 atoms, or ≤75 atoms. Further, this solvent can have a structure which occupies larger space, such as an aryl molecule or otherwise a molecule with double bonds. For example, the uncured layer 172 can include benzene or xylene.

The support-ribs have a real part of a refractive index $n_S \geq 1.7$ or $n_S \geq 2.0$ and an extinction coefficient $k_S \geq 0.1$, across the ultraviolet spectrum, across the visible spectrum, across the infrared spectrum, or combinations thereof. Example materials of the support-ribs 92 include an oxide of hafnium, lead, niobium, tantalum, titanium, tungsten, zirconium, silicon or combinations thereof.

The support-ribs 92 can include organic moieties to facilitate manufacturing, to affect WGP performance, or combinations thereof. These organic moieties can be part of the material composition of the uncured layer 172, and can remain after the uncured layer 172 is cured to form the support-ribs 92. For example, ≥0.1%, ≥1% and ≥25%, ≥50% of atoms in the support-ribs 92 can be part of organic moieties. As another example, a mass percent of the organic moieties in the support-ribs can be ≥0.1% and ≤20%. The organic moieties can include —$CH_3$, —$CH_2CH_3$, or both. As another example, all organic moieties can include ≤3 carbon atoms.

The cap 152 can have the same or a different material composition as/than the support-rib 92. In one embodiment, the caps 152 and the support-ribs 92 can comprise silicon dioxide. In one embodiment, the support-ribs 92 and not the caps 152 can include organic moieties due to different methods of deposition/formation of each (e.g. support-ribs 92 typically formed by spin-on then imprint and the caps 152 typically formed by sputter).

The support-ribs 92, the substrate 11, and the cap 152 can have the same or similar material composition. For example, ≥70%, ≥80%, ≥90%, or ≥95% of a material composition of the support-ribs 92, the substrate 11, and the cap 152 can be the same. The support-ribs 92, the substrate 11, the cap 152, or combinations thereof can be transparent across the ultraviolet spectrum, the visible spectrum, the infrared spectrum, or combinations thereof. The wire 132 can be reflective, across the ultraviolet spectrum, the visible spectrum, the infrared spectrum, or combinations thereof.

As illustrated in FIG. 23, the second method can further comprise step 230, including applying a conformal layer 231 on cured support-ribs 92, forming optical device 232. Step 230 can follow any of steps 190, 200, or 220. The conformal layer 231 can be applied by atomic layer deposition. The conformal layer 231 can have a refractive index ($n_{231}$) that is higher than a refractive index ($n_{92}$) of the support-ribs 92. Example values of these refractive indices include: $n_{92} \geq 1.3$, $n_{92} \geq 1.5$, or $n_{92} \geq 1.7$; $n_{92} \leq 1.6$, $n_{92} \leq 1.8$, or $n_{92} \leq 1.99$; $n_{231} \geq 2.0$ or $n_{231} \geq 2.2$; and $n_{231} \leq 3.0$ or $n_{92} \leq 4.0$. These refractive index $n_{231}$ and $n_{92}$ values and relationships can be such values and relationships across the ultraviolet spectrum, visible spectrum, infrared spectrum, or combinations thereof. If the optical device is a waveguide, addition of the conformal layer 231 can improve waveguide performance, especially if $n_{231} > n_{92}$ at a wavelength or across a wavelength range of intended use.

First and Second Methods, Wire Separation

It can be useful for the wires 62 or 132 to be separate from wires 62 or 132 on adjacent support-ribs 22 or 92. The following paragraphs describe how to achieve this in both the first method and the second method.

In the first method, a preferred method of deposition is sputter. Pressure in the chamber can be raised for less directional deposition, resulting in deposition of the wire 62 from all angles and preferential deposition of the wire 62 at a distal end D of the support-ribs 22. A deposition pressure that is too high, however, can result in too slow of a deposition rate. A pressure of five millitorr is suggest for balancing (a) deposition of the wire 62 from all angles by high pressure; with (b) lower pressure to improve deposition rate.

In the second method, preferred deposition methods include evaporation or low pressure sputter, either resulting in directional deposition of the wire 132 on the upper-side $92_u$ and the distal end $92_d$ of each support-rib 92. In evaporation or low pressure sputter, pressure can be lowered as far as possible while still maintaining a plasma. In the second method, with slanted support-ribs 92, directional deposition, such as by evaporation or low pressure sputter, can facilitate separation of wires 62 on adjacent support-ribs 92.

In the first method, the channels 41 can be partially blocked, by the cap 52 described above, to facilitate separation of wires 62 on adjacent support-ribs 22. In the second method, the channels 93 can be partially blocked, by the cap 152 described above, to facilitate separation of wires 132 on adjacent support-ribs 92.

A shape of support-ribs 22 or 92 can help facilitate separation of wires 62 or 132. The support-ribs 22 in FIGS. 2-8 are illustrated with a curved distal end D, which facilitates manufacturing, but can make it more difficult to keep the wires 62 separate from each other. The distal end $92_d$ of support-ribs 92 in the second method, and illustrated in FIGS. 9-10 and 13-16, have a rectangular shape, which can be more difficult to manufacture, but can help keep wires 132 separate from each other. The distal end $92_d$ of support-ribs 92 in the second method, and illustrated in FIGS. 11 and 19-20, have a trapezoid shape, which can further assist in keeping wires 132 separate from each other. The rectangular shape of FIGS. 9-10 and 13-16 and the trapezoid shape of FIGS. 11 and 19-20, and described above, can be applied in the first method. The stamp 13 in the first method can be replaced by the stamp 171 of FIGS. 17-22.

A high aspect ratio (AR) of the support-ribs 22 or 92 can help facilitate separation of wires 62 or 132, where AR=$Th_{22}$/P or AR=$Th_{92}$/P, $Th_{22}$ is a thickness of support-ribs 22, $Th_{92}$ is a thickness of support-ribs 92, and P is a pitch of the support-ribs 22 or 92.

If the above methods are insufficient for keeping the wires 62 or 132 separate, and if the wires 62 or 132 are made of aluminum, then any small amount of aluminum in the channels 41 or 93 can be oxidized to form aluminum oxide, thus separating pure aluminum wires 62 or 132 from each other. Aluminum was used as an example—oxidation can be used with other suitable materials. An isotropic etch may also be used to remove any small amount of wires 62 or 132 in the channels 41 or 93.

Third Optical Device, with Slanted Support-Ribs 92

As illustrated in FIG. 23, optical device 232 can include a conformal layer 231 on support-ribs 92. The support-ribs 92 of optical device 232 are illustrated with a shape similar to the support-ribs 92 of optical device 110, but these support-ribs 92 can have other shapes as described herein. The conformal layer 231 and the support-ribs 92 can have refractive index values as described above. If the optical device is a waveguide, addition of the conformal layer 231 can improve waveguide performance, especially if $n_{231} > n_{92}$ at a wavelength or across a wavelength range of intended use. Optical device 232 can be formed into a WGP, such as for example with addition of a wire 132 as described herein.

What is claimed is:

1. A wire grid polarizer (WGP) comprising:
   an array of parallel, elongated support-ribs on a face of a substrate with channels between adjacent support-ribs, the channels including an air-filled region extending along a length of the channels, the length of the channels being a longest dimension of the channels;
   each support-rib having a cross-sectional profile with a proximal end located closest to the substrate and a distal end located farthest from the substrate, and sides facing the channels and extending from the proximal end to the distal end;
   the sides of the support-ribs are inclined to one side with all support-ribs leaning in a single direction, the sides including an inner-side which leans towards and faces the substrate and an upper-side opposite of the inner-side and facing away from the substrate;
   $15° \leq A_{92} \leq 75°$, where $A_{92}$ is a smallest angle between a plane and the face of the substrate, the plane extending along a length of each support-rib through a center of the support-rib from the proximal end to the distal end;
   $15° \leq A_{pi} \leq 75°$ and $105° \leq A_{pu} \leq 165°$, where $A_{pi}$ is an external angle between the inner-side and the face of the substrate, and $A_{pu}$ is an external angle between the upper-side and the face of the substrate;
   a wire on the upper-side and the distal end of each support-rib, each wire being separate from wires on adjacent support-ribs;
   the support-ribs and the substrate are transparent, and the wire is reflective across the ultraviolet spectrum, the visible spectrum, the infrared spectrum, or combinations thereof; and
   $\geq 75\%$ of the inner-side of each support-rib is free of material of the wire and $\geq 75\%$ of the face of the substrate in the channels is free of material of the wire.

2. The WGP of claim 1, wherein $\geq 0.1\%$ and $\leq 50\%$ of atoms in the support-ribs are part of organic moieties.

3. The WGP of claim 1, wherein organic moieties there is a maximum of 15° variation of $A_{92}$ among the support-ribs.

4. A wire grid polarizer (WGP) comprising:
   an array of parallel, elongated support-ribs on a face of a substrate with channels between adjacent support-ribs;
   each support-rib having a cross-sectional profile with a proximal end located closest to the substrate and a distal end located farthest from the substrate, and sides facing the channels and extending from the proximal end to the distal end;
   the sides of the support-ribs are inclined to one side, the sides including an inner-side which leans towards and faces the substrate and an upper-side opposite of the inner-side and facing away from the substrate;
   $15° \leq A_{92} \leq 75°$, where $A_{92}$ is a smallest angle between a plane and the face of the substrate, the plane extending along a length of each support-rib through a center of the support-rib from the proximal end to the distal end;
   a wire on the upper-side and the distal end of each support-rib, each wire being separate from wires on adjacent support-ribs; and
   the support-ribs and the substrate are transparent, and the wire is reflective, across the ultraviolet spectrum, the visible spectrum, the infrared spectrum, or combinations thereof.

5. The WGP of claim 4, wherein $\geq 0.1\%$ and $\leq 50\%$ of atoms in the support-ribs are part of organic moieties.

6. The WGP of claim 4, where there is a maximum of 15° variation of $A_{92}$ among the support-ribs.

7. The WGP of claim 4, wherein $\geq 75\%$ of the inner-side of each support-rib is free of material of the wire.

8. The WGP of claim 4, wherein $\geq 75\%$ of the face of the substrate in the channels is free of material of the wire.

9. The WGP of claim 4, wherein $Th_{132i} \leq 20$ nm, where $Th_{132i}$ is a maximum thickness of the wires on the inner-sides, measured perpendicular to the inner-side.

10. The WGP of claim 4, wherein $Th_{132u}/Th_{132i} \geq 5$, where $Th_{132u}$ is a maximum thickness of the wire on the upper-side, measured perpendicular to the upper-side, and $Th_{132i}$ is a maximum thickness of the wire on the inner-side, measured perpendicular to the inner-side.

11. The WGP of claim 4, wherein $Th_{132u}/Th_{132s} \geq 5$, where $Th_{132u}$ is a maximum thickness of the wire on the upper-side of any support-rib, measured perpendicular to the upper-side, and $Th_{132s}$ is a maximum thickness of the wire on the face of the substrate in a channel adjacent to the support-rib, measured perpendicular to the face of the substrate.

12. The WGP of claim 4, further comprising a cap on the upper-side and the distal end of each support-rib and sandwiched at least partly between each wire and each support-rib, wherein:
   the cap has a different material composition than the support-rib;
   the cap is transparent across the ultraviolet spectrum, the visible spectrum, the infrared spectrum, or combinations thereof; and
   the cap having a linear profile facing the support-rib and a curved profile facing the wire.

13. The WGP of claim 4, wherein $|180° - A_{pi} - A_{pu}| \leq 10°$, where $A_{pi}$ is an external angle between the inner-side and the face of the substrate, and $A_{pu}$ is an external angle between the upper-side and the face of the substrate.

14. The WGP of claim 4, wherein $|A_{pi} - A_{di}| \leq 20°$ and $|180 - A_{pu} - A_{du}| \leq 20°$, where $A_{pi}$ is an external angle between the inner-side and the face of the substrate, $A_{di}$ is an internal angle between the inner-side and the distal end, $A_{pu}$ is an external angle between the upper-side and the face of the substrate, and $A_{du}$ is an internal angle between the upper-side and the distal end.

15. The WGP of claim 4, wherein the face of the substrate in the channels is blocked by the support-ribs as viewed from perpendicular to the face of the substrate.

16. The WGP of claim 4, wherein $45° \leq A_{pi} \leq 65°$ and $115° \leq A_{pu} \leq 135°$, where $A_{pi}$ is an external angle between the inner-side and the face of the substrate, and $A_{pu}$ is an external angle between the upper-side and the face of the substrate.

17. The WGP of claim 4, wherein $$\cos^{-1}\left(\frac{1.1 * L_c}{L_i}\right) \le A_{92} \le \cos^{-1}\left(\frac{0.3 * L_c}{L_i}\right),$$

where $A_{92}$ is an external angle between the inner-side and the face of the substrate; $L_c$ is a straight-line distance, from one support-rib to an adjacent support-rib in the channel, parallel to the face of the substrate; and $L_i$ is a straight-line distance of the inner-side from the proximal end to the distal end.

18. The WGP of claim 4, wherein the support-ribs have a real part of a refractive index $n_S \le 1.4$.

19. A method of making a wire grid polarizer (WGP), the method comprising:
applying an uncured layer on a face of a substrate;
imprinting a pattern of uncured support-ribs in the uncured layer, wherein $15° \le A_{12} \le 75°$, where $A_{12}$ is a smallest angle between a plane and the face of the substrate, the plane extending along a length of each support-rib through a center of the support-rib from the proximal end to the distal end;
curing the uncured layer, including curing the uncured support-ribs into support-ribs that are solid and cured; and
depositing a wire on the upper-side and the distal end of each support-rib, each wire being separate from wires on adjacent support-ribs.

20. The method of claim 19, wherein depositing the wire includes normal angle deposition.

* * * * *